UNITED STATES PATENT OFFICE.

WILLIS H. POST, OF BATTLE CREEK, MICHIGAN, ASSIGNOR TO POSTUM CEREAL CO. LIMITED, OF BATTLE CREEK, MICHIGAN, A PARTNERSHIP.

BEVERAGE EXTRACT.

1,067,938.

Specification of Letters Patent.

Patented July 22, 1913.

No Drawing.

Application filed October 7, 1912. Serial No. 724,429.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and has for its object the production of a readily soluble extract from roasted plums, prunes or the like, and the preparation therefrom of a beverage which is nutritious and possesses many of the desirable properties of this fruit.

Dried plums, and particularly dried prunes which are a variety of plums, have long been valued for their dietary properties as well as for their demulcent and laxative properties both in raw condition and when stewed.

As the result of extended experiments, I have discovered that plums containing considerable fruit sugar and particularly prunes which are known to be rich in sugar may be made to yield a soluble solid extract from which a palatable beverage may quickly be prepared possessing, in a marked degree, the valuable dietary and other well known properties of this fruit.

While the various forms of edible plums may be used for the preparation of the extract, I prefer to use prunes because of their large content in sugar which lends itself to caramelization and because of the wide recognition of the valuable properties of this fruit.

By way of illustrating one way in which the benefits of my invention may be secured, dried prunes as they are found on the market are dried at temperatures sufficient to render them friable and are then roasted, the temperature being sufficient to caramelize the sugar contents and preferably sufficient to slightly carbonize some of the cellular material. To facilitate the production of a uniformly roasted product, the prunes after the drying operation may be ground to liberate the kernels. Roasting then proceeds, as described. The roasted product is next extracted with hot or cold water to remove soluble extractive matter. The extraction is, however, preferably conducted by percolation with water at about 50° to 60° C., thereby usually obtaining a clear solution. Should the solution not be clear, filtration is resorted to for this purpose. The clear aqueous solution is next concentrated by evaporation to a solid. This operation is preferably conducted in a vacuum pan or on a rotary drum *in vacuo*, the usual precaution well-known to those skilled in this art being taken to prevent injurious heating of the product. The dried extract is then comminuted or reduced to grains, powder, flakes or other subdivided form and is ready for packing. Instead of subjecting the prunes as a whole to the roasting operation, the pulp may be roasted alone, in which case the pulp and stones may be separated for example by stewing and straining or in any other manner. I prefer, however, to practice the process as above described, since the flavor of the solid extract is improved by the presence of the kernels and pericarp with the pulp in the roasting step; and also because the water extraction is facilitated by the presence of this more or less cellular material. The resulting product is a beverage extract of extreme solubility in water, either hot or cold, is palatable and possesses the nutritious and, to a certain extent, the laxative qualities of the prunes from which it is made.

What I claim is:—

1. A solid soluble extract for preparing beverages, consisting of extractive matter in soluble form of roasted prunes.

2. A solid soluble extract for preparing beverages, consisting of extractive matter in soluble form of prunes roasted to a degree sufficient to caramelize the sugar content.

3. A solid soluble extract for preparing beverages, consisting of soluble extractive matter in comminuted form derived from roasted prunes.

4. A solid soluble extract for preparing beverages, consisting of soluble extractive matter in comminuted form derived from prunes roasted to a degree sufficient to caramelize the sugar content.

5. A solid soluble extract for preparing beverages, consisting of extractive matter in soluble form of roasted pulp of prunes.

6. A solid soluble extract for preparing beverages, consisting of extractive matter in soluble form of edible plums roasted to a degree sufficient to caramelize their sugar content.

7. A solid soluble extract for preparing beverages, consisting of extractive matter in soluble form of partially carbonized prunes.

In testimony whereof I have signed this specification in the presence of two subscribing witnesses.

WILLIS H. POST.

Witnesses:
G. M. LA PIEVIE,
VERN D. SUTTON.

Copies of this patent may be obtained for five cents each, by addressing the "Commissioner of Patents, Washington, D. C."